US007203258B2

United States Patent
Cresens (10) Patent No.: US 7,203,258 B2
(45) Date of Patent: Apr. 10, 2007

(54) ACQUISITION ALGORITHM IN ASYNCHRONOUS CDMA SYSTEMS

(75) Inventor: Wim Cresens, Rotselaar (BE)

(73) Assignee: Agilent Technologies, Inc., Santa Clara, CA (US)

( * ) Notice: Subject to any disclaimer, the term of this patent is extended or adjusted under 35 U.S.C. 154(b) by 770 days.

(21) Appl. No.: 10/401,068

(22) Filed: Mar. 27, 2003

(65) Prior Publication Data

US 2004/0190605 A1    Sep. 30, 2004

(51) Int. Cl.
H03D 1/04    (2006.01)
(52) U.S. Cl. ..................... 375/346; 375/348
(58) Field of Classification Search ........ 375/140–153, 375/316, 346, 347–351, 340
See application file for complete search history.

(56) References Cited

U.S. PATENT DOCUMENTS

| 6,064,695 | A  | * | 5/2000  | Raphaeli ................. 375/230 |
| 6,456,827 | B1 | * | 9/2002  | Kubo et al. .............. 455/68  |
| 6,813,309 | B1 | * | 11/2004 | Ogino ..................... 375/148 |
| 2002/0094018 | A1 | * | 7/2002  | Terao ..................... 375/147 |
| 2003/0128747 | A1 | * | 7/2003  | Poon et al. .............. 375/148 |
| 2004/0042534 | A1 | * | 3/2004  | Raphaeli et al. ......... 375/150 |

* cited by examiner

*Primary Examiner*—Chieh M. Fan
*Assistant Examiner*—Jason M. Perilla (57) ABSTRACT

A method for the acquisition of synchronisation signals in a spread spectrum communication system includes:
Receiving a synchronisation signal,
Applying to said synchronisation signal a dwelling procedure, including calculating a matched filter output, calculating the energy value of said matched filter output, and accumulating said energy values over a range equal to the slot length in a RAM,
Repeating said dwelling procedure,
After each dwelling procedure searching the maximum energy value and the corresponding RAM address,
Comparing the address found with the address corresponding to the maximum in the previous dwelling procedure,
If said address is the same, incrementing a counter that keeps the number of consecutive occurrences of a maximum at the same position,
otherwise setting the counter to zero,
When said counter reaches a user defined threshold value, breaking off the dwelling procedure, and
Passing said RAM address to a receiver timing device.

7 Claims, 7 Drawing Sheets

| Nr Of Dwells | Address | Maximum Value |
|---|---|---|
| 1 | 3339 | 462 |
| 2 | 2268 | 661 |
| 3 | 2218 | 825 |
| 4 | 1205 | 884 |
| 5 | 1646 | 978 |
| 6 | 79 | 1211 |
| 7 | 1646 | 1396 |
| 8 | 1646 | 1472 |
| 9 | 1646 | 1545 |
| 10 | 79 | 1616 |
| 11 | 79 | 1780 |
| 12 | 79 | 2122 |
| 13 | 79 | 2220 |
| 14 | 79 | 2415 |
| 15 | 79 | 2560 |
| 16 | 79 | 2685 |
| 17 | 79 | 2901 |
| 18 | 79 | 3113 |
| 19 | 79 | 3246 |
| 20 | 79 | 3448 |
| 21 | 79 | 3529 |
| 22 | 79 | 3605 |
| 23 | 79 | 3606 |
| 24 | 79 | 3993 |
| 25 | 79 | 3993 |
| 26 | 79 | 4366 |
| 27 | 79 | 4680 |
| 28 | 79 | 4836 |
| 29 | 79 | 5201 |
| 30 | 79 | 5396 |
| 31 | 79 | 5458 |
| 32 | 79 | 5783 |

ACQUISITION ALGORITHM IN ASYNCHRONOUS CDMA SYSTEMS

FIELD OF THE INVENTION

The present invention is related to a cell synchronisation procedure in asynchronous Code Division Multiple Access (CDMA) communication systems.

STATE OF THE ART

In the physical layer of a CDMA system several procedures are essential for system operation. One is the so-called cell search procedure in which the terminal searches for the cell in which it operates and to which it has to synchronise. The so-called synchronisation channel (SCH) is used for this purpose. The SCH consists of two channels: the Primary Synchronisation Channel (SCH1) and the Secondary Synchronisation Channel (SCH2).

The SCH1 contains a code word with a length of 256 chips. This code word is identical for every cell. Once the terminal has identified SCH1, slot synchronisation can be obtained since the SCH1 code indicates the slot boundary. For the SCH1 search procedure typically a matched filter implementation is used for detecting the SCH1 code word.

A CDMA system typically starts in an unsynchronised condition, as the slot boundaries of the incoming data are not yet known. Therefore the energy values of the consecutive matched filter outputs are calculated. These energy values are a measure for the degree of correlation of the filtered data and the code that is being searched for within the filtered data. The occurrence of a peak in the filter energy values within the range of one slot-length indicates the position of the SCH1 code within this range and hence the necessary synchronisation phase, which equals the timing offset needed for the receiver to get slot synchronisation.

In order to have a more rugged detection, one can store the energy values, over a range of one slot length, in a RAM and consecutively accumulate the matched filter output values d times with d a chosen number of accumulations. This operation is called "dwelling". After a sufficient amount of dwells the maximum value within the RAM is sought. Given the fact that the chosen RAM depth is equal to the slot length, the position of the maximum value in the RAM (i.e. the RAM-address of this value) then as well indicates the necessary synchronisation phase for the terminal.

AIMS OF THE INVENTION

The present invention aims to provide an Early Phase Finding Algorithm for the Primary Synchronisation in Asynchronous CDMA Systems, that outperforms the prior art algorithms in terms of synchronisation time and power consumption.

SUMMARY OF THE INVENTION

The present invention is related to a method for the acquisition of synchronisation signals in a spread spectrum communication system, comprising the following steps:
  Receiving a synchronisation signal,
  Applying to said synchronisation signal a dwelling procedure, whereby said dwelling procedure comprises the steps of calculating a matched filter output, calculating the energy value of said matched filter output, accumulating said energy values over a range equal to the slot length in a RAM,
  Repeating said dwelling procedure, whereby the method further comprises the following steps:
  After each dwelling procedure searching the maximum energy value and the corresponding RAM address,
  Comparing the address found with the address corresponding to the maximum in the previous dwelling procedure,
  If said address is the same, incrementing a counter that keeps the number of consecutive occurrences of a maximum at the same position,
  If said address is not the same, setting the counter to zero,
  When said counter reaches a user defined threshold value, breaking off the dwelling procedure,
  Passing said RAM address to a receiver timing device.

In another embodiment the method for the acquisition of synchronisation signals comprises the following steps:
  Receiving a synchronisation signal,
  Applying to said synchronisation signal a dwelling procedure, whereby said dwelling procedure comprises the steps of calculating a matched filter output, calculating the energy value of said matched filter output, accumulating said energy values over a range equal to the slot length in a RAM,
  Repeating said dwelling procedure over a predetermined number of slots, whereby the method further comprises the following steps:
  In parallel with the last dwelling operation, searching the maximum energy value and the corresponding RAM address, and
  Passing said RAM address to a receiver timing device.

Advantageously a module for primary synchronisation comprises means for applying a method as described above.

Such a module may be comprised in an integrated circuit device.

In a specific embodiment a receiver apparatus comprises such a module or integrated circuit device.

Alternatively a spread-spectrum communication apparatus comprises such a module or an integrated circuit device.

DETAILED DESCRIPTION OF THE INVENTION

The invention relates to the SCH1 search procedure. In the prior art the basic Synchronisation Phase Finding algorithm is accomplished in the following steps (see FIG. 1):
  Filtering the received data by means of a matched filter which is set to the searched SCH1 code, Calculating the energy of the matched filter outputs, Consecutively accumulating these energy values over a range equal to the slot length in a RAM (dwelling step)., Repeating the previous three steps over an amount of slots equal to the chosen number of dwells, Finding the maximum value in this RAM (Maximum Finding Step), Providing the RAM address of the maximum value to the receiver timing-device as a phase to synchronise the receiver with the transmitter on slot basis.

Figure 1:
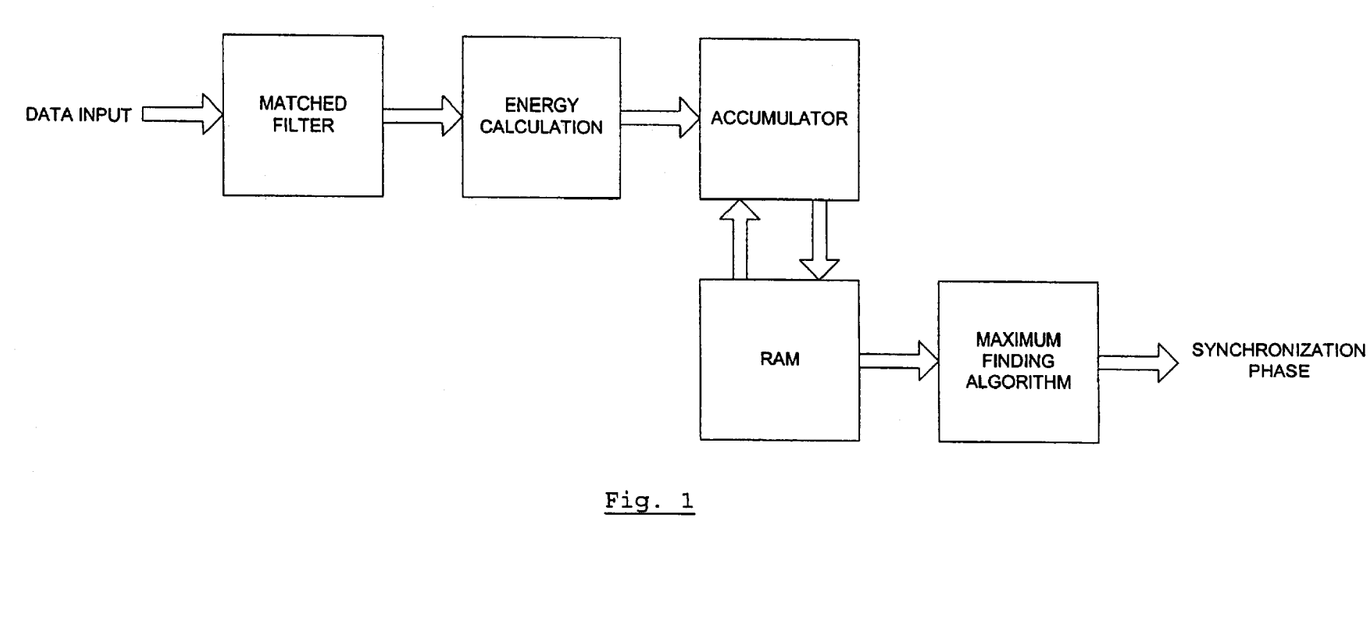
FIG. 1 represents the prior art approach.

During the prior art synchronisation procedure the RAM is accessed $s+2 \cdot s \cdot (d-1)$ times, with s the length of a slot (expressed in number of half chips) and d the number of dwells. The RAM is accessed s additional times during the maximum finding step. This results in a total amount of $k=2 \cdot s \cdot d$ RAM accesses. For example: given a number of dwells of d=32 and a slot length of s=5120 half. chips, the total amount of RAM accesses is:

$$k=2 \cdot s \cdot d=2 \cdot 5120 \cdot 32$$

k=327680

In a first embodiment of the invention the maximum search algorithm is invoked in parallel with the last dwelling stage instead of after all the dwelling stages are finished. In a second embodiment a search algorithm is invoked in parallel with the dwelling stages and, additionally, a comparison is made between the search algorithm results. Based on this comparison a decision is made on whether to stop the dwelling early or not. This approach allows a reduction of the synchronisation time and of the RAM access and hence of the power consumption.

EXAMPLE 1

Figure 2:
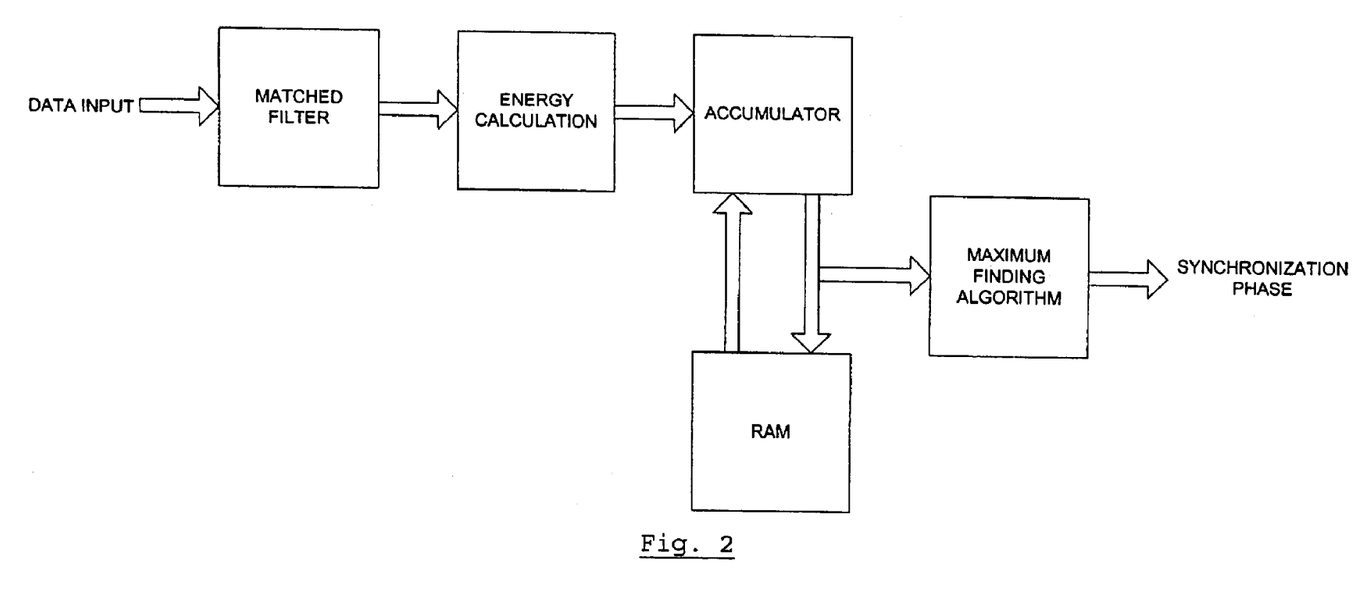
FIG. 2 represents an early phase finding algorithm according to a first embodiment of the invention, with a fixed number of dwells.

FIG. 2 is a schematic of the Early Phase Finding Algorithm according to the first embodiment with a predetermined, fixed number of dwells. During the $d^{th}$ dwelling stage the energy values of this dwelling stage are accumulated with the accumulation values of the $(d-1)^{th}$ stage. The accumulation results can be sent in parallel to the RAM as well as to the maximum finding algorithm. For the sake of possible further processing, the values of the last dwell need to be stored in the RAM. Hence the maximum finding algorithm can be invoked in parallel to the last dwelling operation. This avoids the necessity of accessing the RAM s additional times for reading out the values of the last dwell after the dwelling has finished.

The invention contains the combination of the $d^{th}$ (i.e. the last) dwelling step and the maximum finding step. The above mentioned algorithm results in $l=s+2 \cdot s \cdot (d-1)$ RAM accesses. By executing the last dwell and the maximum finding algorithm in parallel, synchronisation time is shortened. For the same reason the number of RAM accesses is reduced, hence power is saved.

A numerical example is provided. Given a number of dwells of d=32 and a slot length of s=5120 half chips, the total amount of RAM accesses with a combination of the $d^{th}$ dwelling step and the Maximum Finding Step is:

$$l=s+2 \cdot s \cdot (d-1)$$

$$l=5120+2 \cdot 5120 \cdot 31$$

l=322560

Hence the ratio l/k=0.98 results in a 2% reduction of RAM accesses.

EXAMPLE 2

Figure 3:
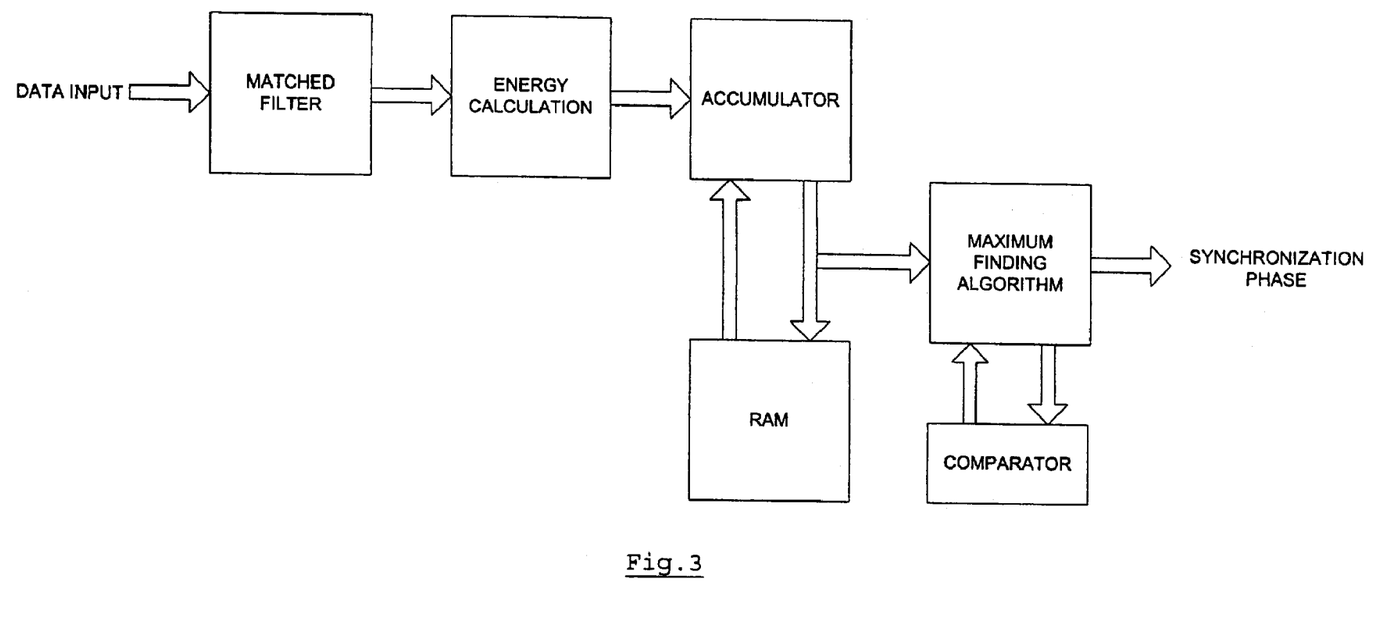
FIG. 3 represents an early phase finding algorithm according to a second embodiment of the invention, with a reduced number of dwells.

In a second embodiment a reduced number of dwells is used (see FIG. 3). Note that in the first Phase Finding Algorithm, the number of dwells is user defined and fixed. Executing all of these predefined dwelling stages might result in a redundant number of dwelling stages, as it is highly probable that not all d dwells are needed to find an energy maximum clear enough for a correct SCH1 code detection.

Figure 4:
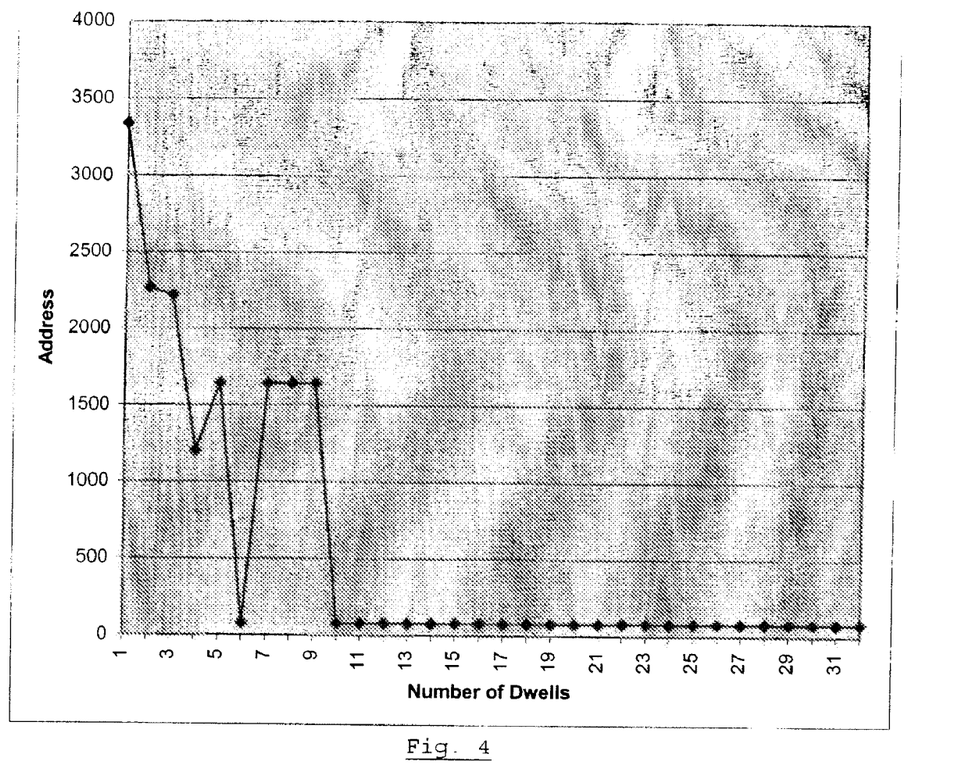
FIG. 4 represents the address value vs. the number of dwells.

In this solution, after each dwelling stage, the position found for the maximum, is compared with the position found previously. When a sufficient amount of dwells is performed and thus when the maximum is found, the position of the maximum will remain constant for the dwelling stages to follow. This is made clear in FIG. 4, which shows the address value (=position of the slot boundary in 1 slot range) of the maximum found. In this example, the address remains constant from the $10^{th}$ dwelling onwards until the $32^{nd}$ dwelling. A counter is implemented, which counts the amount of consecutive occurrences of equal positions of the maximum. When this counter reaches a user defined threshold value, one can assume the correct maximum value is found and break off the dwelling. By reducing the number of dwells in this way the synchronisation time is shortened. For the same reason the number of RAM accesses is reduced, hence power is saved.

Again a numerical example is given. When in this test one would set the threshold of the number consecutive equal maximum positions needed to 5 the maximum would be found after d=14 dwells. The total amount of RAM accesses (for a given slot length of 5120 half chips) would be:

$$m=s+2 \cdot s \cdot (d-1)=5120+2 \cdot 5120 \cdot (14-1)$$

m=138240

Given these numbers the ratio l/m equals 0.42, so this test case results in 58% less RAM accesses as compared to the basic search algorithm.

Figure 5:
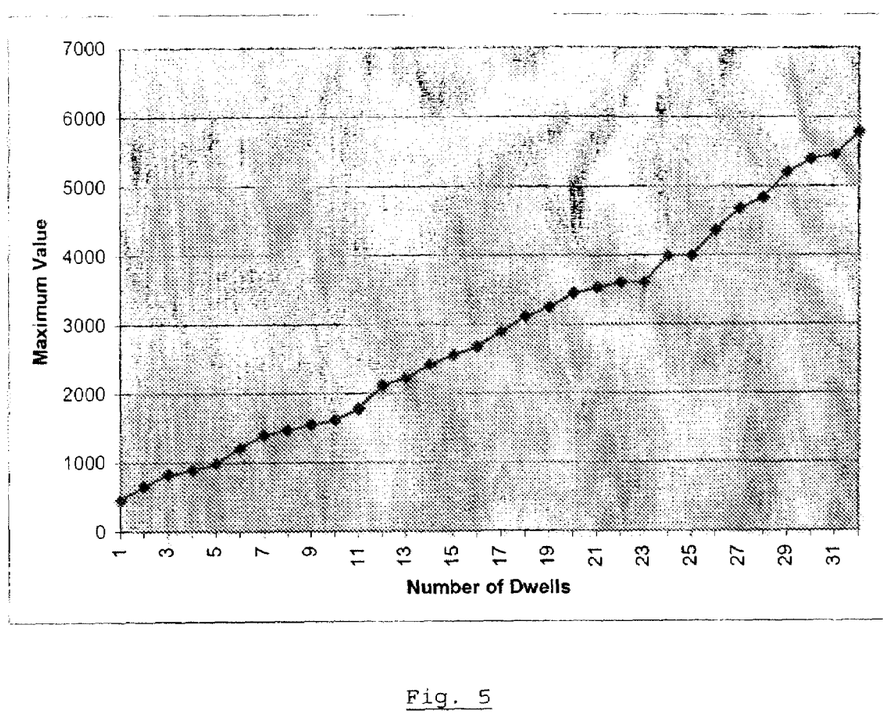
FIG. 5 represents the maximum value vs. the number of dwells.
Figure 6:
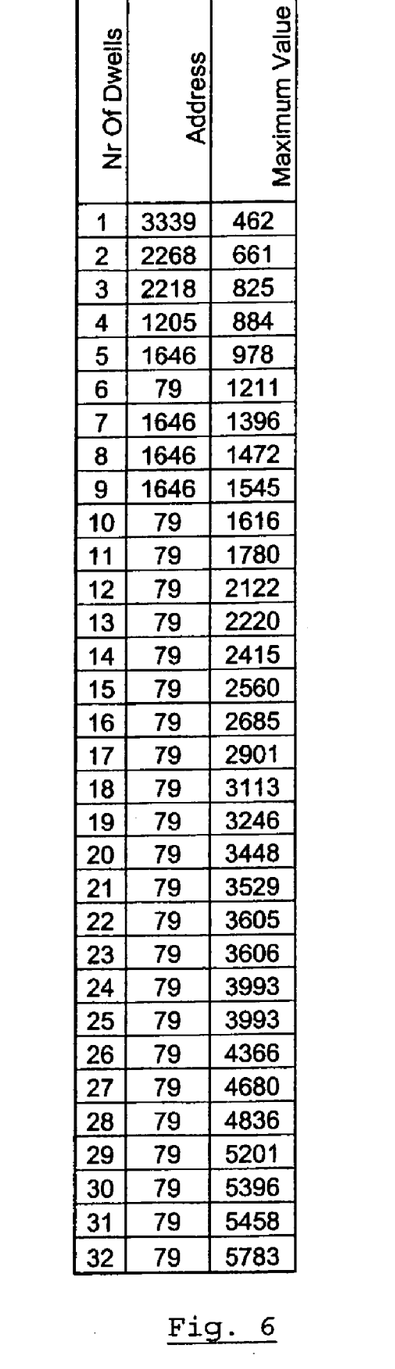
FIG. 6 represents a table with number of dwells, the address corresponding to the maximum value and said maximum value.

There is a trade off, as for each dwell the maximum value found in the accumulated energies increases in a quasi-linear fashion. This is shown in FIG. 5 and FIG. 6. This implies that this value would be approximately half as strong for an acquisition with 16 dwells than for one with 32 dwells. Comparing the "Strength of the Acquisition" for an acquisition of 14 dwells and one with 32 dwells, this results in the ratio 2415/5783=0.42 hence an acquisition that is 58% less strong than a full acquisition. It is up to the user to decide on the strength of this value. The more consecutive occurrences of equal positions of the maximum value are required, the stronger the maximum value will be.

Figure 7:
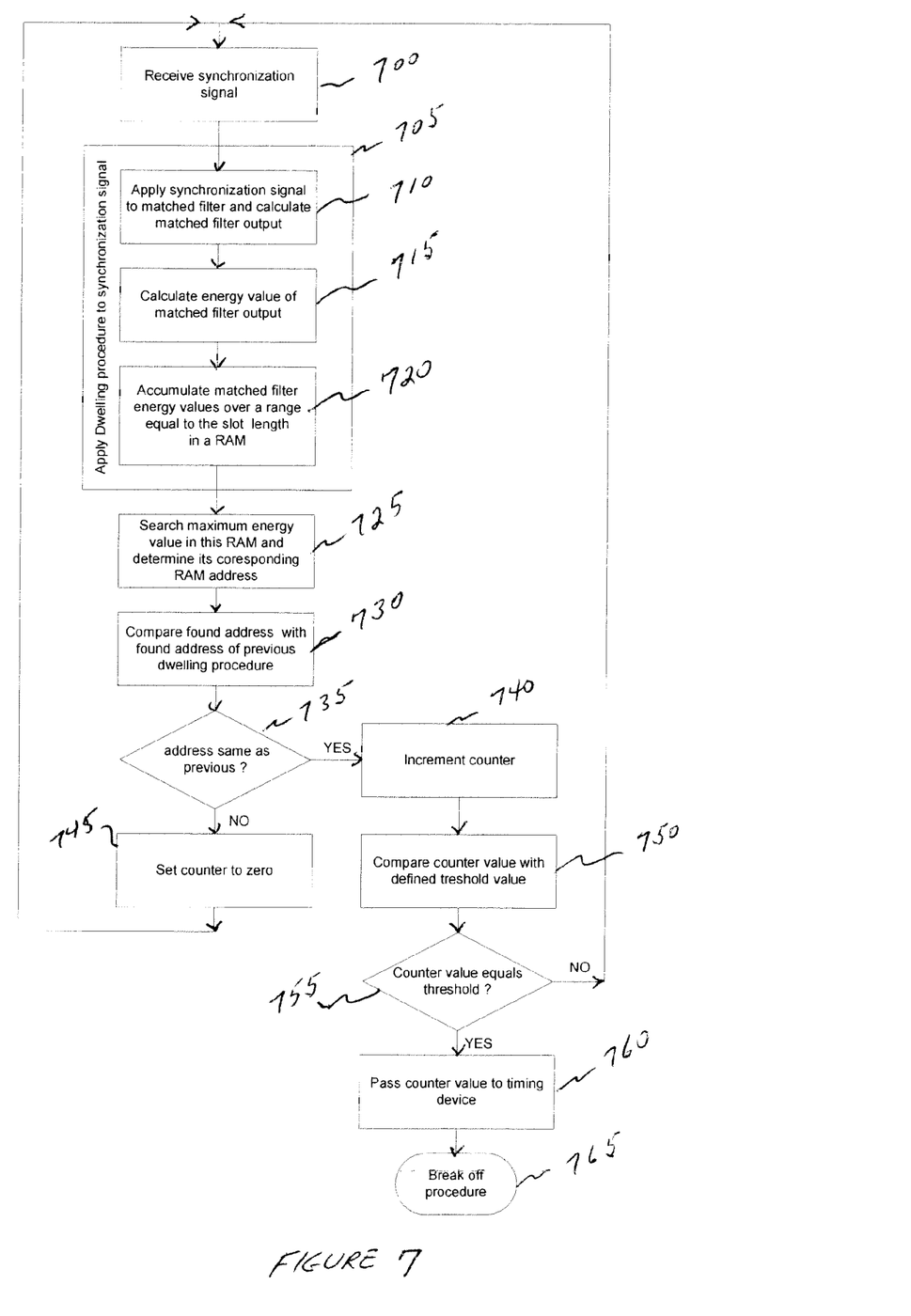
FIG. 7 shows a flow diagram according to the disclosed embodiments.

FIG. 7 shows a flow diagram according to the disclosed embodiments. Block 700 shows receiving a synchronization signal. Block 705 shows applying to the synchronization signal a dwelling procedure, whereby the dwelling procedure includes calculating a particular synchronization signal matched filter output (Block 710), and an energy value of the matched filter output (Block 715). Block 720 shows storing the accumulated energy value in a random access memory (RAM) at a RAM address corresponding to the particular synchronization signal matched filter output and repeating the dwelling procedure for a different particular synchronization signal matched filter output throughout a range equal to the slot length in the RAM.

Block 725 shows that after each dwelling procedure, the maximum energy value in the RAM and its corresponding RAM address are found. In block 730, the address found is compared with an address corresponding to the maximum energy value found in the previous searching procedure.

As shown in blocks 735 and 740, if the address found is the same, a counter is incremented that keeps the number of consecutive occurrences of a maximum at a same position. As shown in blocks 735 and 745, if the address found is not the same, the counter is set to zero. In blocks 750 and 755, when the counter reaches a user defined threshold value, the address found is passed to a receiver timing device (Block 760) and the procedure ends (Block 765).

The invention claimed is:

1. A method for the acquisition of synchronization signals in a spread spectrum communication system, comprising:

Receiving a synchronization signal,

Applying to said synchronization signal a dwelling procedure, whereby said dwelling procedure comprises the steps of:

Calculating a particular synchronization signal matched filter output to create an accumulated energy value, Storing the accumulated energy value in a random access memory (RAM) at a RAM address corresponding to the particular synchronization signal matched filter output, Repeating said dwelling procedure for a different particular synchronization signal matched filter output throughout a range equal to a slot length in the RAM, After each dwelling procedure, searching for the maximum accumulated energy value in the RAM and finding its corresponding RAM address as the latest address found, Comparing the latest address found with a previous address corresponding to the maximum energy value found in a previous searching procedure, If the latest address found is the same as the previous address, incrementing a counter that keeps the number of consecutive occurrences of a maximum at a same position, If the latest address found is not the same as the previous address, setting the counter to zero, When the counter reaches a user defined threshold value, breaking off the dwelling procedure, and Passing the latest address found to a receiver timing device.

2. A module for primary synchronisation, comprising means for applying the method of claim 1.

3. An integrated circuit device, comprising a module as in claim 2.

4. A receiver comprising a module as in claim 2.

5. A spread-spectrum communication apparatus comprising a module as in claim 2.

6. A receiver comprising an integrated circuit device as in claim 3.

7. A spread-spectrum communication apparatus comprising an integrated circuit device as in claim 3.

* * * * *